United States Patent [19]

Eby

[11] 4,105,186
[45] Aug. 8, 1978

[54] FLOW CONTROL VALVE

[75] Inventor: Ralph H. Eby, Metamora, Ind.

[73] Assignee: Skinner Irrigation Co., Cincinnati, Ohio

[21] Appl. No.: 726,824

[22] Filed: Sep. 27, 1976

[51] Int. Cl.² ............................................. F16K 31/126
[52] U.S. Cl. ...................................... 251/35; 251/30; 251/46
[58] Field of Search ..................... 251/30, 35, 37, 42, 251/45, 46

[56] References Cited

U.S. PATENT DOCUMENTS

| 1,807,191 | 5/1931 | Boyle | 251/30 |
| 2,882,006 | 4/1959 | Remecke | 251/30 |
| 3,112,094 | 11/1963 | Nees et al. | 251/30 |
| 3,367,621 | 2/1968 | Griswold | 251/35 |
| 3,379,406 | 4/1968 | Greer | 251/45 |
| 3,674,237 | 7/1972 | Heyer et al. | 251/37 |
| 3,967,808 | 7/1976 | Lieding | 251/46 |

Primary Examiner—Martin P. Schwadron
Assistant Examiner—G. L. Walton
Attorney, Agent, or Firm—Biebel, French & Nauman

[57] ABSTRACT

A flow control valve of the type in which flow through the valve is controlled by means of a diaphragm which operates by differential pressure on its opposite faces to move between open and closed positions with respect to the flow path through the valve. In this type of valve an aperture is formed through the diaphragm to place its opposite faces in communication with the pressure existing in the flow path through the valve and a metering rod extends through the aperture in the diaphragm to meter flow through the aperture and maintain it free of foreign material. The metering rod in the valve of the present invention is mounted so that it can move about one of its ends to allow it to accommodate non-uniform movement of the diaphragm and prevent binding of the metering rod in the diaphragm aperture.

3 Claims, 5 Drawing Figures

FLOW CONTROL VALVE

BACKGROUND OF THE INVENTION

One type of commonly used flow control valve incorporates a diaphragm mounted within the valve and with one face of the diaphragm exposed to the fluid flow path through the valve and the opposite face exposed to a closed pressure chamber. An aperture is formed through the diaphragm so that fluid pressure in the valve flow path is transmitted to the opposite face of the diaphragm and, because the area of the opposite face of the diaphragm is larger than the face exposed to the flow path, a greater total pressure developes on the pressure chamber side of the diaphragm, forcing it to a closed position.

To open the valve a passage connecting the pressure chamber to the downstream side of the flow path is opened to allow the pressure in the pressure chamber to decrease and the diaphragm to move from its closed to its opened position.

The size of the aperture through the diaphragm will control the rapidity with which the diaphragm operates to open and close the valve. While a reasonably fast acting valve is desirable, it will be appreciated that damage to the lines with which the valve is associated can occur if the aperture in the diaphragm is too large, since pressure build ups will occur too rapidly and cause the diaphragm to slam into the closed position. However, the aperture cannot be made too small because it would then be susceptible to clogging by either the build up of corrosion on the wall of the aperture or the presence of foreign particles in the valve.

To overcome these problems conventional practice is to provide a fairly large size aperture through the diaphragm and then decrease the open area of the aperture by means of a metering rod which is fixed in the valve and extends through the diaphragm aperture.

In this way, the diaphgram aperture can be formed fairly large without rapid pressure build ups and possible damage to the valve and the movement of the diaphgram while the metering rod remains fixed tends to keep the diaphgram aperture free from clogging by either corrosive build up or foreign particles.

However, the diaphgram does not always move uniformly between its open and closed positions. In other words, the diaphragm may lift from its seat at one area before it does at another area rather than moving uniformly off its seat at all portions of its periphery. This non-uniform movement of the diaphragm can result in the metering rod binding in the aperture opening, particularly since the clearance between the rod and the diaphragm aperture is rather small, and result in the valve being stuck in the open position.

Thus, while the use of a metering rod avoids the problems noted above with regard to the rapidity of the closing of the valve and the clogging of the diaphragm aperture, it will be seen that it nonetheless presents the additional problem of binding which can cause the valve to malfunction in the open position.

SUMMARY OF THE INVENTION

In a flow control valve in accordance with the present invention, the metering rod is mounted for non-axial movement in response to non-uniform movement of the diaphragm off its valve seat so that the metering rod can remain essentially aligned with the axis of the diaphgram aperture and binding and subsequent malfunction of the valve is avoided.

Thus, in accordance with the present invention the metering rod is mounted within an opening formed in an inner end of a flow adjustment stem which extends into the pressure chamber above the diaphragm.

A pin is mounted in the end of the flow adjustment stem, and an opening on the end of a metering rod, which can be formed simply by looping the end of the rod, receives the pin loosely to permit movement of the metering rod about its one end secured to the flow adjustment stem.

While the metering rod can be formed with a circular cross section, certain benefits may be obtained by forming the rod with a non-circular cross sectional configuration, such as a square cross section. With a square cross sectioned rod improved cleaning of the diaphgram aperture is obtained as the diaphgram moves along the rod between the open and closed positions of the valve.

Additionally, the inner end of the flow adjustment stem carrying the metering rod can be provided with a bleed port to release pressure and prevent the diaphgram from becoming fixed in the open position. Thus, if the diaphgram were to contact squarely the inner end of the flow adjustment stem, it might become fixed in this position. The bleed port prevents this.

DESCRIPTION OF THE PREFERRED EMBODIMENTS

Figure 1:
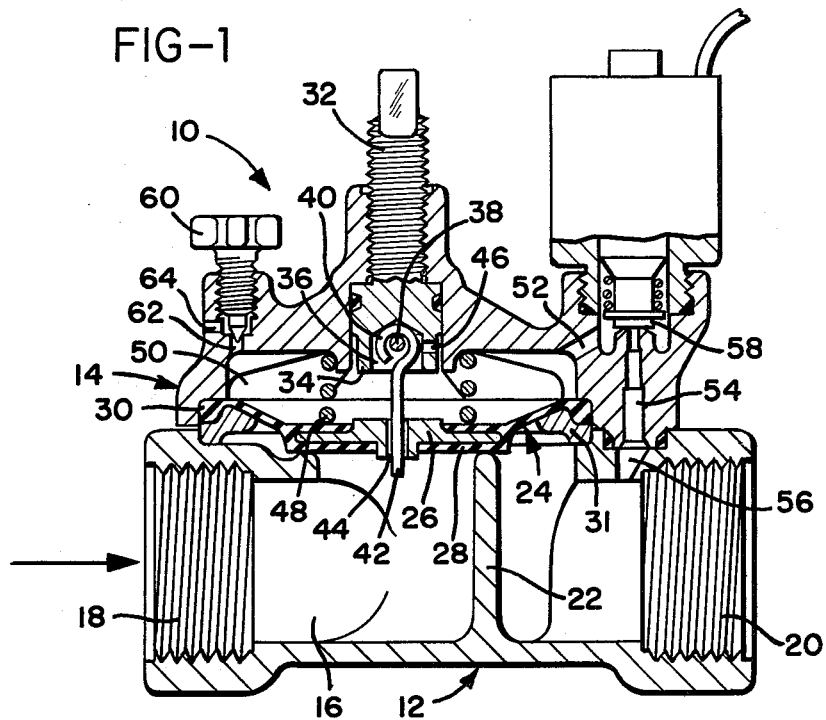
FIG. 1 is a cross sectional elevational view showing a flow control valve in accordance with the present invention.
Figure 2:
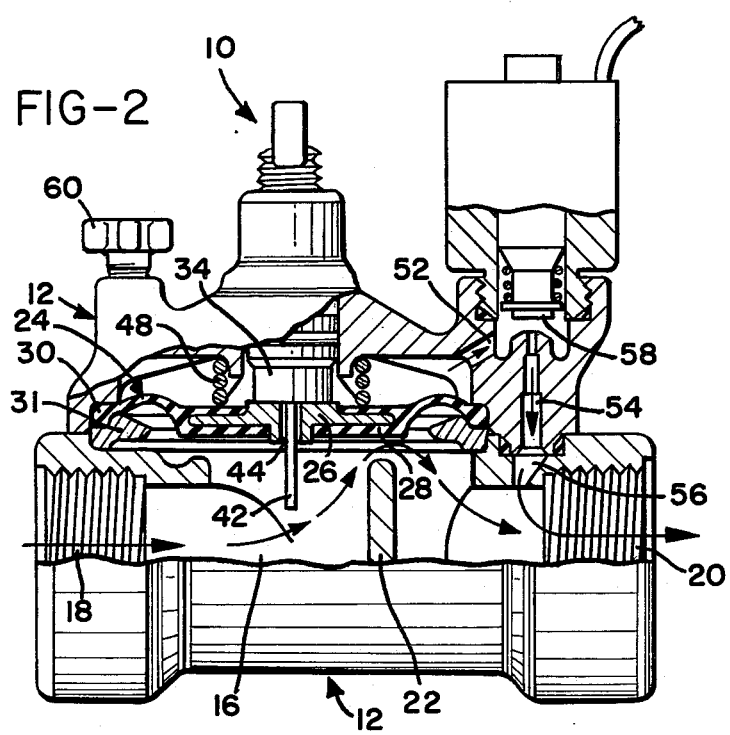
FIG. 2 is a partial cross sectional elevational view showing the valve in the open position and the flow adjustment stem moved from the position shown in FIG. 1.

The valve 10 as shown in FIGS. 1 and 2 of the drawings includes a body portion 12 and a cover 14 secured to the body portion in any convenient manner, such as by bolts or the like. The body portion includes a flow path 16 having an inlet side 18 and an outlet 20 separated by a partition 22.

The cover 14 is positioned over a diaphragm 24 consisting of a central, disc shaped member 26 encapsulated around its edges in an elastomeric material 28 which has a circular configuration and is clamped adjacent its outer peripheral edge 30 between the cover 14 and body 12, with a diaphragm support ring 31 interposed between opposing portions of the body and diaphragm.

The cover 14 includes a threaded flow adjustment stem 32 threaded into a top portion of the cover for adjustment towards and away from the diaphragm 24. The inner end 34 of the flow adjustment stem serves as a stop for the diaphragm so that the amount of opening of the diaphragm can be adjusted as will be apparent from a comparison of FIGS. 1 and 2.

The inner end of the flow adjustment stem has an opening 36 formed therein and carries a cross pin 38 received in a loop 40 formed on the upper end of a metering rod 42 which extends through an aperture 44 formed through the center of the diaphragm 24. It will also be noted from FIG. 1 of the drawings that a pressure relief port 46 is formed in the end of the flow adjustment stem communicating with the hollow portion 36 of the inner end of the stem.

A spring 48 biases the diaphragm to the seated position shown in FIG. 1 so that the diaphragm together with opposing portions of the cover 14 defines a pressure chamber 50 separated from the flow path 16 by the diaphragm 24. A passageway 52 extends angularly upwardly from the pressure chamber and communicates at its upper end with a second, stepped passageway 54 which communicates at its lower end 56 with the outlet end 20 of the flow path through the valve body.

A solenoid actuated valve 58 is spring biased to the closed position shown in FIG. 1 of the drawings, separating passage 52 from passage 54. It will also be noted that a manual control valve 60 is mounted in the cover 14 and in the closed position shown in FIG. 1 of the drawings separates an inner passageway 62 from an outer passageway 64.

With the above construction it will be seen that with the valve in the closed position shown in FIG. 1 of the drawings and fluid under pressure present in the upstream end of the flow path, fluid pressure will be transmitted through the aperture 44 to the pressure chamber 50. Because the area of the diaphragm in the pressure chamber is greater than area of the diaphragm exposed to the flow path, the diaphragm will remain seated in a closed position with respect to the flow path.

However, when the solenoid actuated valve 58 is energized, moving the solenoid actuated valve to the position shown in FIG. 2 of the drawings, the pressure in the pressure chamber 50 is relieved through the passageways 52 and 54, allowing the line pressure to raise the diaphgram to the open position shown in FIG. 2 of the drawings.

Where the flow adjustment stem is moved inwardly into the valve so that there are very small clearances between the open and closed position of the diaphragm it is possible that the upper portion of the valve which abutts the inner end of the flow adjustment stem in the open position might stick in the open position by adhering to the inner end of the flow adjustment stem. To avoid the possibility of this occuring the bleed port 46 is formed which automatically relieves pressure in the hollow end 36 of the flow adjustment stem.

Figure 3:
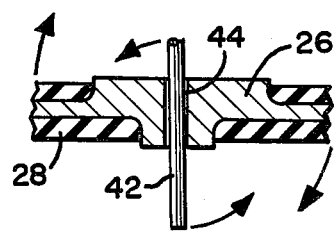
FIGS. 3 and 4 are enlarged views of a portion of the flow control valve showing the metering rod moved from the position shown in FIGS. 1 and 2 of the drawings to accommodate non-uniform movement of the diaphragm.
Figure 4:
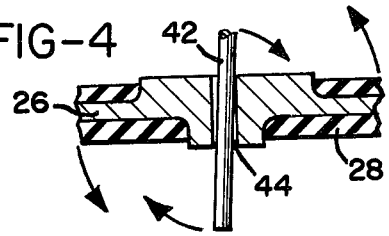

As the diaphragm moves from its closed to open position its movement may be non-uniform, that is, it may lift from its seat adjacent one area before it does at another area so that the diaphragm is cocked with respect to its seat. This is shown in FIGS. 3 and 4 of the drawings where by way of example the diaphragm is shown as cocked in two different positions, although it will be apparent that it may assume any number of positions.

Regardless of this, the mounting of the metering rod allows the metering rod to move non-axially about one end thereof to accommodate the non-uniform movement of the diaphragm, thereby preventing binding of the metering rod within the aperture 46 in the diaphragm, while still allowing the metering rod to function to meter the flow through the aperture 44 and maintain the aperture free of corrosion and foreign particles through the relative movement of the rod 42 and the walls of the aperture 44.

Figure 5:
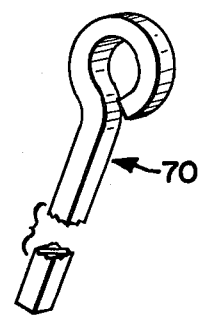
FIG. 5 is a perspective view of a modified form of metering rod.

In this regard, as shown in FIG. 5 of the drawings, improved cleaning action may be obtained by forming at least that portion of the rod within the aperture 44 of non-circular cross sectional configuration. Thus as seen in FIG. 5, the modified metering rod 70 is of square cross sectional configuration although it will be apparent that other non-circular configurations can be used for this purpose.

From the above it will be apparent that the present invention provides an improved flow control valve in which binding of the valve metering rod within the diaphragm is avoided despite non-uniform movement of the valve diaphragm between its open and closed positions.

While the forms of apparatus herein described constitute preferred embodiments of the invention, it is to be understood that the invention is not limited to these precise forms of apparatus, and that changes may be made therein without departing from the scope of the invention.

What is claimed is:

1. In a flow control valve including a fluid flow path through said valve, a pressure chamber, a diaphragm separating said flow path and said pressure chamber and movable by differential pressure between open and closed positions with respect to said flow path, a flow adjustment stem projecting into said pressure chamber for limiting movement of said diaphragm from said closed position to said open position thereof, said diaphragm having an aperture therethrough to allow fluid pressure on the flow path side of said diaphragm to be transmitted to the pressure chamber side of said diaphragm, and a metering rod extending through said aperture in said diaphragm, the improvement comprising:
   means defining an opening in an inner end of said flow adjustment stem,
   a pressure relief port formed in said inner end of said stem and communicating with said opening in said stem,
   a pin projecting through said inner end of said stem and across said opening,
   means defining a loop on an end of said metering rod positioned within said pressure chamber, and
   said loop on said rod loosely receiving said pin whereby said metering rod is mounted for movement about the looped end thereof to accommodate non-uniform movement of said diaphragm and prevent binding of said metering rod in said diaphragm aperture.

2. The valve of claim 1 wherein: said metering rod is non-circular in cross section.

3. In a flow control valve including a fluid flow path through said valve, a pressure chamber, a diaphragm separating said flow path and said pressure chamber and movable by differential pressure between open and closed positions with respect to said flow path, said diaphragm having an aperture therethrough to allow fluid pressure on the flow path side of said diaphragm to be transmitted to the pressure chamber side of said diaphragm, and a metering rod extending through said aperture in said diaphragm, the improvement comprising:
   a flow adjustment stem protruding into said pressure chamber to limit movement of said diaphragm,
   means defining an opening in an inner end of said flow adjustment stem, a pin extending through said flow adjustment stem and across said opening therein, an opening on one end of said metering rod and receiving said pin to permit movement of said metering rod about said one end thereof, and a pressure relief port formed in said inner end of said stem and communicating with said opening in said stem.

* * * * *